United States Patent [19]

Eto

[11] 4,383,164
[45] May 10, 1983

[54] METHOD OF MANUFACTURING A CONTROL GRID FOR FLUORESCENT DISPLAY TUBE

[75] Inventor: Goro Eto, Mobara, Japan

[73] Assignee: Futaba Denshi Kogyo K.K., Mobara, Japan

[21] Appl. No.: 103,856

[22] Filed: Dec. 14, 1979

[30] Foreign Application Priority Data

Dec. 16, 1978 [JP] Japan .................. 53-154600

[51] Int. Cl.³ ............................................. B23K 27/00
[52] U.S. Cl. ...................... 219/121 LD; 219/121 LC
[58] Field of Search ..... 219/121 L, 121 LM, 121 LC, 219/121 LD, 121 ED; 228/179; 29/25.14

[56] References Cited

U.S. PATENT DOCUMENTS

| | | | |
|---|---|---|---|
| 2,066,070 | 12/1936 | Farnsworth et al. | 29/25.14 X |
| 2,451,360 | 10/1948 | Skehan | 228/179 |
| 2,878,549 | 3/1959 | Willner | 29/25.14 |
| 3,384,526 | 5/1968 | Abramson et al. | 219/121 LC X |
| 3,520,055 | 7/1970 | Jannett | 219/121 LC X |

FOREIGN PATENT DOCUMENTS 462872  1/1950 Canada .................. 29/25.14

OTHER PUBLICATIONS

Pfluger et al., "Laser Beam Welding Electronic-Component Leads", *Welding Research Supplement*, Jun., 1965, pp. 264-269.

McDonie et al., "Plating Spot Welded Grid Wires for Vacuum Tubes", *RCA Technical Notes*, No. 138, Mar., 1958.

*Primary Examiner*—C. L. Albritton
*Attorney, Agent, or Firm*—Oblon, Fisher, Spivak, McClelland & Maier

[57] ABSTRACT

A method of manufacturing a control grid used in a fluorescent display tube is disclosed. The grid is produced by preparing a fine wire net, placing the wire net upon a metal frame member, and irradiating laser beams to the contact portions of the wire net and frame to weld the wire net and the frame.

7 Claims, 6 Drawing Figures

METHOD OF MANUFACTURING A CONTROL GRID FOR FLUORESCENT DISPLAY TUBE

BACKGROUND OF THE INVENTION

1. Field of the Invention

This invention relates to a method of manufacturing a control grid used in a fluorescent display device.

2. Description of the Prior Art

A fluorescent display tube effects a luminous display of numerals or figures by selectively impinging electrons emitted from a filamentous cathode when energized and heated upon a plurality of anodes on which phosphor layers are deposited.

As shown in FIG. 1, the fluorescent display tube includes anodes 2 having phosphor layers deposited thereon which are arranged on a substrate 1 in the form of letter "8", filamentous cathodes 3, and control grids 4 which are disposed between the anodes 2 and the cathodes 3 for accelerating and controlling electrons emitted from the cathodes and uniformly impinging the electrons upon the anodes. The grid 4 includes a net portion 4a through which the electrons pass and a frame 4b for supporting the net portion 4a. A lead terminal 4c for applying a control voltage to the grid 4 and a strip 4d for holding the grid 4 on the substrate may be provided with the grid 4 as shown in FIG. 1. Reference numeral 5 designates a front cover having a transparent viewing window portion. The front cover is of flat bottom boat shape and hermetically bounded to the substrate 1 at the peripheral portion thereof to form an evacuated envelope within which to contain each of the electrodes in a high vacuum state. The fluorescent display tube further includes outer terminals 6 for applying energizing potentials to each of the electrodes which are airtightly extended to the outside of the envelope through a sealing portion of the substrate 1 and the front cover 5.

As is apparent from FIG. 1, the rate of dimensions of openings to predetermined regions of the net portion 4a, namely, opening rate of the net portion is preferable to be higher, because light emitted from anodes 2 is observed through the net portion 4a of the grid 4. However, as a matter of fact, a wire diameter for forming the net portion 4a and the opening rate are determined taking mounting strength of the grid 4 and acceleration and controlling capacity of the electrons by the grid 4 into consideration, and the grid made of wires of 20-60 μm in diameter and 60-80% of the opening rate is generally used in the conventional fluorescent display tube.

In the prior art method, the grid 4 is prepared by etching a thin metal plate of 30-100 μm thick, such as, for example, a stainless steel plate, a Fe-Ni alloy plate or the like in an openwork pattern as shown in FIG. 2. FIG. 2 illustrates the etched net portion 4a consisting of a honeycomb lattice frame having the diameter of "a", and the length "l" at one side of the frame and hexagonal openings 10b which is manufactured by the conventional etching process. The etched net portion 4a shown in FIG. 2 is of 60-80% opening rate as explained hereinabove, which means 60-80% of materials used in forming the net portion 4a are removed and destroyed by the etching. This is extremely wasteful.

The etching is a chemical treatment which requires complicated processes, for instance, controls of chemical liquid, temperature of each of the etching processes and the like. Furthermore, the metal plate used for the producing the grid 4 is limited to iron or alloys of iron group, such as, for example, a stainless steel. In addition, it is extremely difficult to increase the opening rate of the net portion by making the wires of the net portion 4a fine without decreasing the manufacturing efficiency of the grid.

BRIEF SUMMARY OF THE INVENTION

Therefore, the present invention is intended to eliminate the above-mentioned disadvantages of the prior art.

It is an object of the present invention to provide a method of manufacturing a control grid for fluorescent display tube which simplifies the manufacturing process in a great deal and eliminates waste of materials to be used for the control grid.

It is another object of the present invention to provide a method of manufacturing a control grid for fluorescent display tube which is improved its mechanical strength, opening rate and is excellent in performance.

It is further object of the present invention to provide a method of manufacturing a control grid for fluorescent display tube which eliminates the use of a large-size equipment and complicated production control, thereby to decrease the manufacturing cost.

According to the present invention, the foregoing and other objects are attained by providing a method of manufacturing a control electrode for fluorescent display tube which comprises the steps of preparing a net made of thin metal wires, such as, for example, iron, iron-nickel alloy, stainless steel, tungsten steel, molybdenum steel or the like which is woven in a latticework pattern in advance, placing the wire net upon a frame made of, for instance, iron, iron-nickel alloy or the like, and irradiating laser beams to the contact portions of the wire net and the frame to weld the wire net and the frame.

BRIEF DESCRIPTION OF DRAWINGS

Other objects and many of the attendant advantages of this invention will be readily appreciated as the same becomes better understood by reference to the following detailed description when considered in connection with the accompanying drawings, in which like reference characters designate the same or similar parts throughout the figures thereof and wherein.

DETAILED DESCRIPTION OF THE PREFERRED EMBODIMENT

Now, a method of manufacturing a control grid for fluorescent display tube according to the present invention will be hereinafter described with reference to the accompanying drawings.

Figure 3:
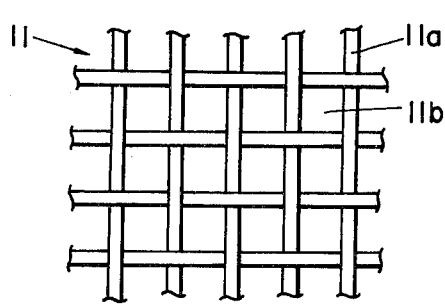
FIG. 3 is a fragmentary enlarged plan view of a wire net used in manufacturing a control grid for fluorescent display tube according to the present invention.

FIG. 3 is a fragmentary enlarged plan view of a wire net 11 used in manufacturing a control grid according to the present invention. As shown in FIG. 3, the wire net 11 is made of latticework of, for instance, thin stainless steel wires 11a having 20-60 μm in diameter, which includes square openings 11b. In this case, if the wires 11a is 40 μm in diameter and a side of the openings 11b is approximately 140 μm in length, the wire net 11 having approximately 60% opening rate can be obtained. When manufacturing a wire net having approximately 80% opening rate using the wire net 11 shown in FIG. 3, the wire 11a may be 40 μm in diameter and a side of the openings 11b may be approximately 340 μm in length. As a latticing material for the wire net 11, a tungsten steel or molybdenum steel can be used. In this instance, the wire net 11 is formed of extremely thin wires having the diameter of 10-20 μm which is enough in strength and results in significant increases of the opening rate.

Figure 4:
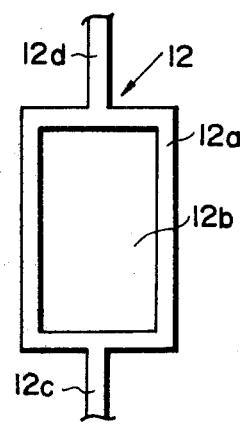
FIG. 4 is an enlarged plan view of a frame used in manufacturing a control grid for fluorescent display tube according to the present invention.

When manufacturing the control grid according to the present invention, a frame 12 for fixing the wire net 11 shown in FIG. 4 is used. The frame 12 is prepared by etching or pressing thin iron plates or iron group alloy plates, such as, for example, a stainless steel or ironnickel alloy having approximately 30-100 μm thick. If necessary, the frame 12 may be integrally provided with a terminal 12c and a holding strip 12d.

Reference will now be made to a method of manufacturing the control grid by fixing the wire net 11 to the frame 12 according to the present invention.

Figure 5:
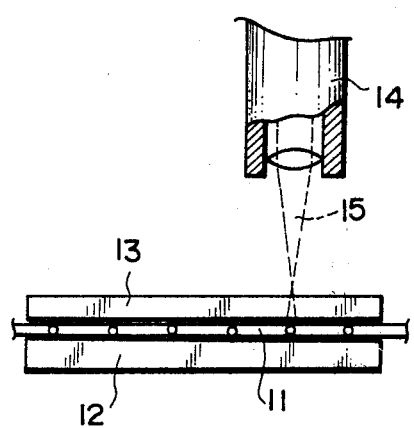
FIG. 5 is a schematic diagram illustrating a method of manufacturing a control grid for fluorescent display tube according to the present invention.
Figure 6:
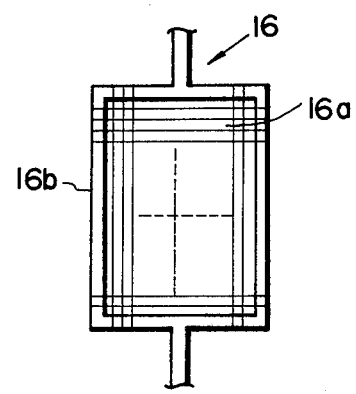
FIG. 6 is a plan view of a control grid for fluorescent display tube manufactured according to the method of the present invention.

In the present invention, laser welding is used as a means for fixing the wire net 11 to the frame 12. In order to make the laser welding, the wire net 11 is sandwiched between the frame 12 and a holding plate 13 having predetermined thickness which is made of light transmitting materials, such as, for example, quartz glass, hard glass or the like as shown in FIG. 5. The use of the holding plate makes it possible to place the wire net 11 upon the frame 12 without slackening. A laser generating apparatus 14 mounted above the holding plate 13 oscillates laser beams 15 which are to be irradiated to contact portions of the wire net 11 and the frame 12 or the vicinity thereof so as to weld the wire net 11 to the frame 12. In the embodiment of the present invention, the wire net 11 is formed of the thin wires of 20-60 μm in diameter, and the frame 12 is formed of the thin metal plate of 30-100 μm in thickness. Accordingly, less thermal energy is required for the welding, which makes it possible to weld the wire net 11 to the frame 12 using the laser generating apparatus of pulse oscillation type. It is to be understood that all of the contact portions of the wire net 11 and the frame 12 is not necessarily welded by the laser beam 15, but the welding at predetermined intervals around the circumference of the wire net 11 is sufficient. In case that the wire net 11 fixed to the frame 12 by the laser welding is extended beyond the periphery of the frame 12, the extended unnecessary portion is cut away, and then a control grid having a net portion 16a and a supporting frame 16b as shown in FIG. 6 is obtained.

Inasmuch as the grid 16 is made of the wire net 11 which is obtained by loosely weaving the thin metal wires 11a in an openwork pattern, there is little loss of the materials for producing the net portion 16a. Furthermore, it is produced extremely at a low cost, because intricated manufacturing process and complicated production management accompanied by the conventional etching process or the like can be completely eliminated.

In addition, according to the present invention, the laser welding is used for fixing the wire net to the frame 12. Thus, the holding plate 13 can be used to press the wire net 11 on the frame 12 and to affix thereto as shown in FIG. 5. This enables to firmly fix the wire net 11 to the frame 12 without creating looseness in the net portion 16a of the grid 16. As a result, the high quality grid 16 can be produced.

Figure 1:
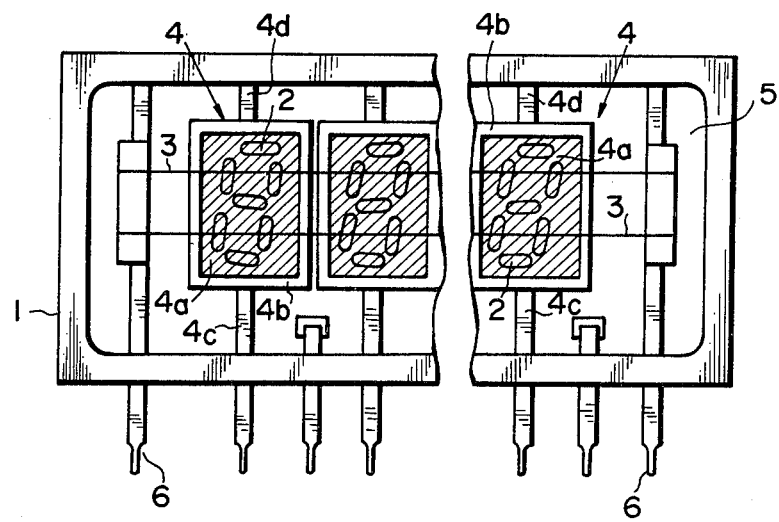
FIG. 1 is a partially cutaway plan view of a fluorescent display tube showing the general assembly thereof.
Figure 2:
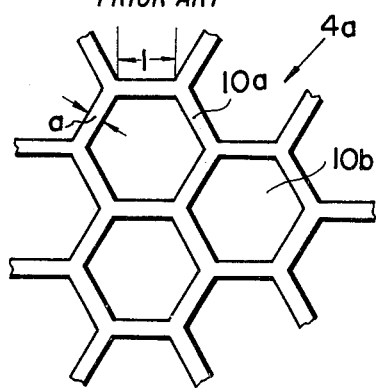
FIG. 2 is a fragmentary enlarged plan view of a control grid used in the conventional fluorescent display tube.

When constructing a fluorescent display tube shown in FIG. 1 using the control grid 16 which includes 60-80% of the opening rate in the net portion 16a of the grid 16, illuminated anodes 2 can be easily observed without having the viewing obstacles. Also, it is possible for the grid 16 to accelerate, control and distribute electrons emitted from cathodes 3 in the same manner as grids 4 having the conventional net portion shown in FIG. 2.

In the embodiment explained hereinabove, the wire net 11 having the square openings 11b is shown. However, it is to be understood that the opening 11b is not limited to be of square shape, but may be of rectangular, lozenge or any optional shape. It is also to be understood that the laser generating apparatus for fixing the wire net 11 to the frame 12 may be those generally used in a laser processing.

As explained hereinabove, in the method of manufacturing the control grid for fluorescent display tube according to the present invention, the control grid is produced by preparing the wire net loosely weaving the thin metal wires in a latticework pattern to be used as a net portion of the grid and fixing the wire net to the frame by the laser welding. Thus, there is no waste of materials in the manufacturing of the net portion. Furthermore, the manufacturing cost can be remarkably decreased, because the method of producing the control grid for fluorescent display tube does not require the chemical processing which necessitates a large-size equipment and complicated production control.

According to the method of manufacturing the control grid for fluorescent display tube in the present invention, the laser welding is used for fixing the wire net to the frame. Thus, the wire net can be easily welded to the frame in a short period of time. In addition, the wire net can be stretched over the surface of the frame without any loosening when it is welded. Thus, the control grid for the fluorescent display tube which is excellent in quality can be obtained.

According to the method of manufacturing the control grid for fluorescent display tube in the present invention, the control grid can be formed of extremely thin wire materials, for instance, a tungsten steel wire of less than 20 μm in diameter which is heretofore impossible to form the control grid by the etching process. Thus, according to the present invention, the control grid which improves its strength and opening rate and is excellent in quality can be obtained.

Obviously, many modification and variations of the present invention are possible in the light of the above teachings. It is therefore to be understood that within the scope of the appended claims, the invention may be practiced otherwise than as specifically described.

What is claimed as new and desired to be secured by letters patent of the United States is:

1. A method of manufacturing a control grid for a fluorescent display tube which effects luminous display of numerals or symbols by accelerating and controlling electrons emitted from a filamentous cathode and selectively impinging the electrons upon anodes on which phosphor layers are deposited comprising the steps of:

preparing a net made of fine metal wire woven in a latticework pattern, said metal wires having diameters lying in the range of 20 to 60 μm;

preparing a thin metal frame member;

mounting the wire net upon the metal frame member;

placing a light transmitting holding plate upon the wire net for pressing and putting the wire net upon the metal frame member; and irradiating laser beams to contract portions of the wire net and the metal frame member through the holding plate, thereby to weld the wire net to the metal frame member.

2. A method of manufacturing a control grid for a fluorescent display tube as defined in claim 1 wherein the wire net is made of stainless steel.

3. A method of manufacturing a control grid for a fluorescent display tube as defined in claim 1 wherein the wire net is made of iron.

4. A method of manufacturing a control grid for a fluorescent display tube as defined in claim 1 wherein the wire net is made of iron-nickel alloy.

5. A method for manufacturing a control grid for a fluorescent display tube as defined in claim 1 wherein the wire net is made of tungsten steel.

6. A method for manufacturing a control grid for a fluorescent display tube as defined in claim 1 wherein the wire net is made of molybdenum steel.

7. A method for manufacturing a control grid for a fluorescent display tube as defined in claim 1 wherein the wire net is welded to the metal frame member at predetermined Locations.

* * * * *